(12) United States Patent
Alshamri

(10) Patent No.: US 8,870,700 B2
(45) Date of Patent: Oct. 28, 2014

(54) AUTOMATIC TRANSMISSION

(75) Inventor: Hmood Mutliq Faheed Alshamri, Riyadh (SA)

(73) Assignee: King Saud University, Riyadh (SA)

( * ) Notice: Subject to any disclaimer, the term of this patent is extended or adjusted under 35 U.S.C. 154(b) by 168 days.

(21) Appl. No.: 13/576,185

(22) PCT Filed: Feb. 14, 2011

(86) PCT No.: PCT/EP2011/000666
§ 371 (c)(1),
(2), (4) Date: Sep. 17, 2012

(87) PCT Pub. No.: WO2011/098293
PCT Pub. Date: Aug. 18, 2011

(65) Prior Publication Data
US 2012/0329602 A1    Dec. 27, 2012

(30) Foreign Application Priority Data
Feb. 15, 2010 (SA) .................. 110310129

(51) Int. Cl.
*F16H 37/04* (2006.01)
*F16H 37/08* (2006.01)

(52) U.S. Cl.
CPC ............ *F16H 37/04* (2013.01); *F16H 37/0833* (2013.01)
USPC ........... 475/219; 475/257; 475/302; 475/337; 475/343

(58) Field of Classification Search
USPC ......... 475/207–209, 219, 257, 291–293, 297, 475/302, 337, 343
See application file for complete search history.

(56) References Cited

U.S. PATENT DOCUMENTS

| 6,863,143 B2 * | 3/2005 | Ha | 475/204 |
| 2010/0063700 A1 * | 3/2010 | Ha | 701/69 |

FOREIGN PATENT DOCUMENTS

| DE | 876646 | 5/1953 |
| DE | 202007007822 | 11/2007 |
| GB | 1082161 | 9/1967 |

OTHER PUBLICATIONS

PCT/EP2011/000666; PCT International Search Report and Written Opinion of the International Searching Authority dated Jun. 8, 2011.

* cited by examiner

*Primary Examiner* — Jacob S Scott
(74) *Attorney, Agent, or Firm* — Renner, Otto, Boisselle & Sklar, LLP

(57) ABSTRACT

Automatic transmission comprising: planetary gears arranged coaxially in a row, each planetary gear comprising a sun wheel, a planetary carrier carrying pivoted planetary wheels and an annulus gear, an input column connected to a sun wheel of a first planetary gear, a general gear positioned adjacent to the row of planetary gears next to a last planetary gear, n mediator gears mounted on an output column and connected to the output column via a freewheel assembly so the mediator gears are freely rotatable in one direction relative to the output column, each mediator gear in engagement with one of the planetary wheels, wherein a planetary carrier of the last planetary gear is fixed to the general gear, and a planetary carrier of each but the last planetary gear connected to a sun wheel of a following planetary gear, wherein rotation of any of the mediator gears can be stopped selectively.

6 Claims, 2 Drawing Sheets

AUTOMATIC TRANSMISSION

TECHNICAL FIELD

This automatic transmission device works by decreasing the velocity emerging from the automatic transmission to get a low speed and a large torque.

BACKGROUND

Among the problems related to previous inventions are the complexity due to the large number of components, high maintenance cost, in addition to the leakage of some power and energy via clutches clinging to each other thereby to increase temperature of the apparatus.

SUMMARY OF THE INVENTION

One of the characteristics of the automatic transmission of this invention is segmentation of the power and distribution of the power through one or more planetary gear of which the device is composed, to transmit all energy without any leakage of torque, and each of the gear planets is easily controlled whenever it is desired to increase the velocity and decrease the torque emerging from the transmission. The automatic transmission is also characterized by its relatively small size, few homogeneous components, easy maintenance, and no energy penetration. A remarkable characteristic is that the gears are always connected to each other (interlocked) and there is no bond breakage between transits. The invention also combines the characteristics of both the conventional and automatic transmission device at the same time.

The invention is characterized by an automatic transmission device which comprises a number n of planetary gears (1, 2, 3, 11, 13, 15) arranged coaxially in a row, each planetary gear (1, 2, 3, 11, 13, 15) comprising a sun wheel (22), a planetary carrier (24) carrying pivoted planetary wheels and an annulus gear (23), an input column (9) connected to a sun wheel of a first planetary gear (1) of the row of planetary gears (3, 15), a general gear (4, 17) positioned adjacent to the row of planetary gears next to a last planetary gear (3, 15), n mediator gears (5, 6, 7, 12, 14, 16), each mounted on an output column (10) and connected to the output column via a freewheel assembly such that the mediator gears (5, 6, 7, 12, 14, 16) are freely rotatable in one direction relative to the output column (10); each mediator gear being in engagement with one of the planetary wheels, wherein a planetary carrier (24) of the last planetary gear (3, 15) is fixed to the general gear (4, 17), and a planetary carrier (24) of each (1, 2, 11, 13) but the last (3, 15) planetary gear being connected to a sun wheel (22) of a following planetary gear (2, 3, 13, 15) positioned adjacently towards the last planetary gear (3, 15), wherein rotation of any of the mediator gears (5, 6, 7, 12, 14, 16) can be stopped selectively.

A transmission ratio between the general gears and the corresponding main gears can be between 0.3 and 0.9, in particular 0.5.

In a preferred embodiment, the automatic transmission device comprises a first final gear which is coaxially mounted to the output column and a second final gear which is in revolving contact with the first final gear. The dimensions of the first final gear and the second final gear may be selected to determine a maximum rotation velocity of the output column.

The invention is distinguished by the existence of a number of planetary gears connected to each other in the following ways (1), (2), and (3) or more, the components of each are presented in FIG. 3: (22), (23), and (24) and the general gear (4) which divide the force coming to it from input column (9) to rotate output column (10) at a low speed and strong torque when all the gears are working and a high speed and low torque when one or more of the gears are controlled or stopped.

The invention is distinguished by the existence of a number of devices functioning as a mediator between gears (5), (6), and (7) and the output column (10) so the movement will be in one direction. In case some of these gears stop working, the output column (10) will continue rotating because of the rotation of the other working gears.

The various diameters of gears (4), (8), (17), and (18) decrease the final transmission ratio for each group, which is usually double the previous one to meet the requirements.

Gears (19) and (20) of various diameters balance the final velocity at the end of each group to be suitable with the minimum velocity, maximum velocity with the velocity of the input column (9).

The invention is distinguished by two links connected to each other: the first on input column (9) and the other on output column (10) whereby output column (10) drives input column (9) if output column (10) is faster than input column (9) and the opposite is not true due to a device working in one direction. This connection is to provide the adverse energy.

BRIEF DESCRIPTION OF THE FIGURES

The specification and features of the device will be elaborated in more detail by the description below of the method of working for an automatic transmission by dividing the energy and then collection.

DETAILED DESCRIPTION

Figure 1:
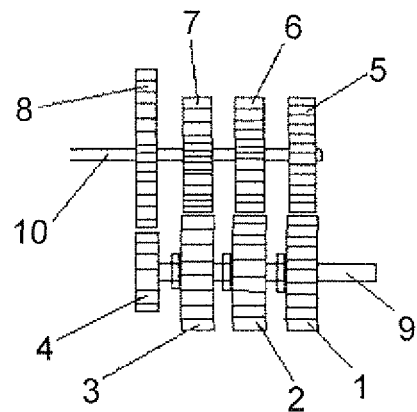
FIG. 1 is a side elevational view of a first embodiment of the present invention, in which:
 (1), (2), and (3) represent planetary gears
 (4) and (8) general gears
 (5), (6), and (7) represent gears working in one direction on output column (10)
 (9) Entering column for movement (input column)
 (10) Exiting column for movement (output column)

The present invention is a device for transmitting automatic movement working on dividing and distributing the energy coming from input column (9) through three planetary gears as in FIG. 1 and the planetary gears are (1), (2), and (3) where (1) receives energy through one of its three components (22), (23), and (24) and the energy is then divided between the other two components. Where one of these components is related to (5) on output column (10), the other transmits what remains of the energy to (2) and (3). The same will happen with (2) and (3) until what remains of the energy reaches (4) which is a general gear and not a planetary gear unit.

In this way, the energy is divided into four parts and the output column (10) moves at a lower speed than input column (9) and with a strong torque. Thus, the speed of output column (10) is calculated by dividing the speed of input column (9) by four.

In the foregoing, we have discussed the procedure of dividing the energy that results in a low speed and a strong torque. In the following, we disclose the procedure for restricting energy where we halt one gear (5) and so the planetary gear (1) related to it stops and all the energy comes out of it and gets distributed between the planetary gears (2) and (3) and the general gear (4). Thus, the speed of output column (10) is calculated by dividing the speed of input column (9) by three.

When we halt gear (6), the planetary gear (2) related to it stops and all the energy comes out of it and becomes distributed between the planetary gear (3) and the general gear (4). Thus, the speed of output column (10) is calculated by dividing the speed of input column (9) by two.

When we halt gear (7), the planetary gear (3) related to it stops and all the energy comes out of it and becomes distributed within the general gear (4). Thus, the speed of output column (10) is calculated by dividing that of input column (9) by one. This means that the speed of output column (10) is approximately equivalent to that of input column (9) paying attention to the fact that the diameter of gear (4) must be smaller than that of (8) so this transmission will be of a desired and not a strong remarkable impact.

The procedure of stopping and controlling the gears could happen in several ways. It could be done by using a belt exerting pressure on a soft area of the gear or by an iron tongue extending into a slot on the gear.

To benefit more from the device, each group must be connected to the other to get a more appropriate transmission movement. This can be seen in FIG. 2 where the first group is represented by the planetary gears (1), (2), and (3) and the second group by the planetary gears (11), (13), and (15). A mutual control process is preferred where at one time a gear from the first group is controlled and at another time a gear from the second group is controlled.

Figure 2:
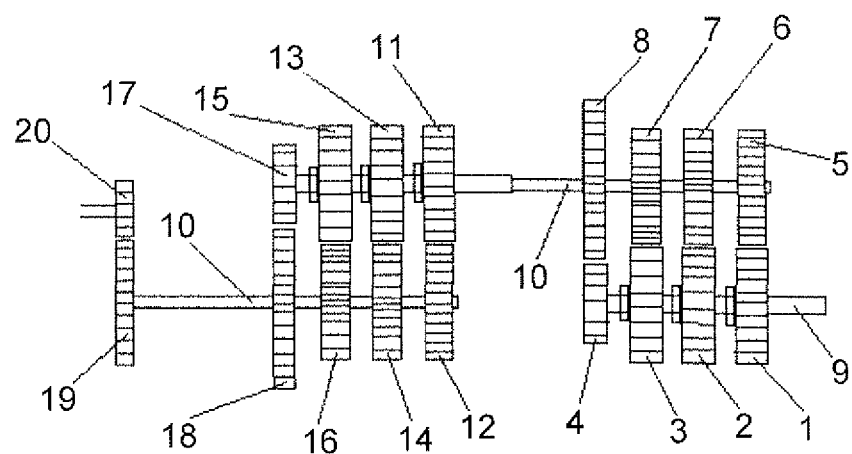
FIG. 2 is a side elevational view of a second embodiment of the present invention, in which:
 (1), (2), (3), (11), (13), (15) represent planetary gears
 (4), (8), (17) and (18) are general gears
 (5), (6), (7), (12), (14) and (16) represent gears working in one direction on output column (10)
 (9) Entering column for movement (input column)
 (10) Exiting column for movement (output column)
 (19) And (20) gears of various diameters to increase velocity
Figure 3:
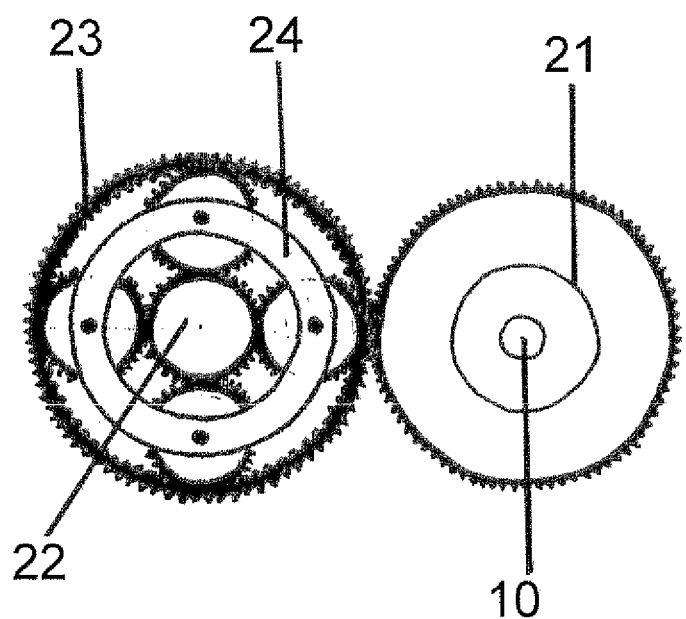
FIG. 3 is a side elevational view of a third embodiment of the present invention, in which:
 (10) exiting column for movement (output column)
 (21) device working in accordance with the gear movement in one direction with (10)
 (22), (23) and (24) planetary gear unit elements

FIG. 2 gives us the following illustrations:

If we suppose that the speed of input column (9) is actual eight rotations, then the number of output column (10) rotations are:

When all planetary gears work, the speed of output column (10) is 0.5 rotations

When we stop gear (5), the speed of output column (10) is 0.66 rotations.

When we stop gear (12), the speed of output column (10) is 0.88 rotations.

When we stop gear (6), the speed of output column (10) is 1.33 rotations.

When we stop gear (14), the speed of output column (10) is 2 rotations.

When we stop gear (7), the speed of output column (10) is 4 rotations.

By changing the diameters of the gears (4) and (8), the number of rotations in this phase decreases from 4 to 2.8 to adapt with the required transmission ratios.

When we stop gear (16), the speed of output column (10) is 5.6 rotations.

By changing the diameters of the gears (17) and (18), the number of rotations in this phase decreases from 5.6 to 4 to adapt with the required transmission ratios.

So column input (9) which supposedly moves 8 rotations gives us the following 7 transmission ratios: 0.5, 0.66, 0.88, 1.33, 2, 2.8, 4.

Finally, the speed of output column (10) must be increased by gears of various diameters (19) and (20) by a ratio of 1:4 so the transmission ratios become: 2, 2.64, 3.52, 5.32, 8, 11.2, 16

So, the input column (9) (8 rotations) gives 2 rotations when all planetary gears work and 16 rotations when all gears stop.

All that was shown above of illustrative examples and calculations present one aspect of the inventive device's work and could be changed according to the gear sizes to meet other requirements.

All gears working on output column (10) are related to it in only one direction. In case, the speed of the column exceeds that of the gear, this is not to affect the gear as it is possible that the gear will stop moving during the rotation of the column. However, the opposite is not true. When the speed of the gear exceeds that of the column, the column is forced to rotate with the gear and this is because a device working in only one direction (21) located between the gear and output column (10). It is because of (21) that the column never stops when we control one of the gears on it.

Output Column (10) is linked to input column (9) by two gears and there is a valve between of the two gears and the column on which it is located in a way that there will be no impact when speed of input column (9) exceeds that of output column (10). However, if the speed of output column (10) exceeds that of input column (9), output column (10) drives input column (9) to provide the adverse energy.

To summarize, the invention relates to an automatic transmission device that works on decreasing the velocity emerging from it. This process is carried out by dividing and distributing of energy over a number of consecutive planetary gears (1), (2), (3), and the normal gear (4). Each of these gears is connected to gears (5), (6), (7), and (8) located on output column (10) whereby each of these gears take some quantity of the energy and transmits the rest of it to the subsequent gears through one of the three components of the planetary gears unit. Each of the gears is composed of three components (22), (23), and (24); (22) is for transmitting energy, (23) is to allow the transmission of some energy to output column (10), and (24) is to allow the transmission of the remaining energy to other planetary gears. In order to increase the velocity emerging out of the device, one of the gears is stopped by halting its component that is transmitting energy to output column (10). Hence, the force is distributed to other planetary gears until all gears are stopped and the force is transmitted from input column (9) to output column (10) through (4) and (8) and passing through all the planetary gears to get a high velocity and low torque.

In order to decrease the velocity, we would release the third component of each gear that is related to output column in order to get a low velocity and high torque from the output column.

With this invention we have an automatic transmission device with strong enduring reliability without losing control over velocity and torque and without complicating it with many components which makes it easier for maintenance. The automatic transmission of the present invention could work in cars, trucks, heavy equipment, and other motors.

The invention claimed is:

1. An automatic transmission device comprising:
a number n of planetary gears arranged coaxially in a row, each planetary gear comprising a sun wheel, a planetary carrier carrying pivoted planetary wheels and an annulus gear, an input column connected to a sun wheel of a first planetary gear of the row of planetary gears, at least one general gear positioned adjacent to the row of planetary gears next to a last planetary gear, n mediator gears, each mounted on an output column and connected to the output column via a freewheel assembly such that the mediator gears are freely rotatable in one direction relative to the output column; each mediator gear being in engagement with one of the planetary wheels, wherein a planetary carrier of the last planetary gear is fixed to the at least one general gear, and a planetary carrier of each but the last planetary gear being connected to a sun wheel of a following planetary gear positioned adjacently towards the last planetary gear, wherein rotation of any of the mediator gears can be stopped selectively.

2. The automatic transmission device according to claim 1, wherein a transmission ratio of a first of the at least one general gear and a corresponding second of the at least one general gear is between 0.3 and 0.9.

3. The automatic transmission device according to claim 1, further comprising a first final gear coaxially mounted to the output column, and a second final gear which is in revolving contact with the first final gear, the dimensions of the first final gear and the second final gear being selected to determine a desired rotation velocity of the output column.

4. The automatic transmission device according to claim 2, further comprising a first final gear coaxially mounted to the output column, and a second final gear which is in revolving contact with the first final gear, the dimensions of the first final gear and the second final gear being selected to determine a desired rotation velocity of the output column.

5. The automatic transmission device according to claim 1, wherein a transmission ratio of a first of the at least one general gear and a corresponding second of the at least one general gear is 0.5.

6. The automatic transmission device according to claim 5, further comprising a first final gear coaxially mounted to the output column, and a second final gear which is in revolving contact with the first final gear, the dimensions of the first final gear and the second final gear being selected to determine a desired rotation velocity of the output column.

* * * * *